United States Patent
Dean

[15] 3,704,039
[45] Nov. 28, 1972

[54] TRUCK BED COVER

[72] Inventor: William H. Dean, 1516 E. Griswold, Phoenix, Ariz. 85020

[22] Filed: Sept. 14, 1970

[21] Appl. No.: 72,052

[52] U.S. Cl. ............................................. 296/137 B
[51] Int. Cl. .................................................. B60j 7/10
[58] Field of Search .180/69 C; 296/100, 105, 137 B, 296/76, 26; 52/66; 135/1 A, 4 A

[56] References Cited

UNITED STATES PATENTS

| | | | |
|---|---|---|---|
| 2,989,340 | 6/1961 | Penner | 296/100 |
| 1,264,310 | 4/1918 | Ledwinka | 296/76 |
| 3,476,375 | 11/1969 | Brasseur | 296/76 X |
| 3,508,787 | 4/1970 | Strong et al. | 296/100 |
| 3,201,171 | 8/1965 | Wickward | 296/105 X |
| 2,535,600 | 12/1950 | Rappl | 296/76 |
| 3,161,433 | 12/1964 | Markel | 52/66 X |
| 2,280,729 | 4/1942 | Sutton | 52/66 X |
| 3,012,814 | 12/1961 | Penner | 296/100 |
| 3,180,674 | 4/1965 | Pounds | 296/100 |
| 3,420,570 | 1/1969 | Kunz | 296/100 |

*Attorney*—Wm. H. Dean
*Primary Examiner*—Benjamin Hersh
*Assistant Examiner*—Robert R. Song

[57] ABSTRACT

A cover for pickup truck beds, said cover releasably hinged on a horizontal axis to the forward end of a pickup truck bed; and an inverted U-shaped stand pivoted to a rearward portion of said cover and having legs with bearing means slidably operable in tracks secured in generally horizontal disposition at opposite inner sides of said pickup truck bed.

14 Claims, 24 Drawing Figures

INVENTOR.
WILLIAM H. DEAN
BY
Wm. H. Dean

INVENTOR.
WILLIAM H. DEAN

FIG. 24.

TRUCK BED COVER

BACKGROUND OF THE INVENTION

Pickup trucks, which are usable for a great variety of purposes, are generally provided with box-shaped beds having an upper open side and at the rearward portions of these beds are pivoted tailgates which pivot on a horizontal axis near the floor of the bed and pivot downwardly and outwardly in a rearward direction into a generally horizontal position and generally at a plane of the floor of the truck bed.

Such pickup truck beds are generally utilized for a great variety of purposes for hauling large and small articles, and heretofore it has been found desirable to provide covers for such truck beds in order to protect various cargo from the elements.

Many of these covers have been made of flexible material such as canvas or other fabric or plastic materials, and such flexible covers have been secured to pickup truck beds by hooks, ropes, snaps, and other devices. These covers have been unsatisfactory in many ways due to the fact that rain collects in the tops of them and tends to form a pool as the top of the flexible cover is deflected. Additionally, the many snaps and rope connections required to maintain such covers in position are undesirable due to the fact that they require considerable time and effort in the connection and disconnection of such covers relative to truck beds.

Such flexible covers are also unsatisfactory due to the fact that many of them shrink, and when secured to truck beds by snaps are troublesome since they cannot be snapped onto the truck bed after they have shrunk.

Many of the prior art covers require a great many fixtures to be secured to a truck bed in order to hold such a cover thereover.

Various metal covers have been used for pickup truck beds and these covers are quite shallow, thereby limiting the vertical space in which articles may be hauled in the pickup truck bed. Many of the shallow metal covers are fixed by hinges at the forward ends of the truck beds and are so connected that they require considerable time and effort to remove them so that the truck bed may be used for hauling large articles which extend normally above the area of the shallow covers.

Various pivoted covers have been provided for pickup truck beds and such covers have used various types of stands for holding them in pivoted upward position. However, such stands have been generally, in one way or another, bolted to the pickup truck bed and the covers so as to prevent them from readily being removable.

Many pickup trucks are utilized by tradesmen who carry tools and other valuable equipment which should be protected from the elements and also should be locked up to prevent theft thereof. However, tradesmen find it necessary to utilize their trucks in many instances to haul large articles, and if they desire to have a cover for securing valuable articles in the truck bed, the cover must be readily removable in order to permit the truck bed to be utilized for hauling large articles.

Accordingly, prior art truck bed covers have been generally unsatisfactory for one reason or another, as for example the canvas covers are difficult to use and maintain; most of the shallow rigid covers are not provided with sufficiently simple hardware so as to enable the cover to be readily removed from the pickup truck when desired. Furthermore, most of the fixtures utilized for pivoting covers to a truck bed and for supporting them in upward open position, are relatively complicated and difficult to remove, thereby causing operators thereof a great waste of time and inconvenience during the removal and replacement of such shallow covers relative to a pickup truck bed.

Many pickup truck users desire a pickup truck bed cover for a great variety of uses, however, when valuable articles are carried in the bed, the cover should be provided with means for locking it in secure position and the cover should be relatively weatherproof so as to protect valuable articles transported in pickup truck beds. Many owners of pickup trucks use them for recreation and sporting events such as hunting and fishing, and also for commercial purposes. Accordingly, a shallow cover must be readily removable for commercial use and may then be readily replaced on the truck bed for covering articles such as sporting goods and various other pieces of equipment that a sportsman may wish to transport into the outdoors. Covers for such purposes must protect the sporting equipment from weather and theft.

SUMMARY OF THE INVENTION

In accordance with the present invention, a cover for pickup truck beds is provided with releasable hinge structure disposed on a horizontal axis at the forward end of a pickup truck bed and the cover is provided with a U-shaped inverted stand pivoted to a rearward portion of the cover at the inner side thereof and the stand is provided with legs having bearing means slidably operable in tracks secured in generally horizontal disposition at opposite inner sides of the pickup truck bed so as to permit pivotal raising of the cover of the invention to an elevated open position relative to the rearward portion of the truck bed and to hold it in such position so that it may readily be lowered by pivoting the stand and allowing the bearing means to traverse said tracks such that the cover may be lowered to a closed position relative to the rear end of the pickup truck bed.

The invention thus comprises very simple means including a releasable hinge structure, and the stand of the invention is readily removable relative to said tracks without unbolting or altering the structure of the stand. The releasable hinge structure at the forward end of the cover is very easily, readily, and quickly releasable from the pickup truck bed so that the entire cover of the invention may be removed in approximately 1 minute, or replaced within 1 minute, by a single operator.

The invention also comprises novel releasable hinge means for the forward end of the cover of the invention, such that the pivotal bearings of the hinge means may be readily released by rearward movement of the cover relative to the hinge means, and may readily be replaced by a forward movement of the cover relative to the hinge means.

The invention comprises novel mechanism of the releasable hinge means at the forward end of the cover for releasing the cover relative to the pickup truck bed on which it is pivotally mounted. The means for releasing the hinge means comprises a pair of manually operable screws at the inner side of the truck bed, which are readily accessible when the cover of the invention is supported in raised elevated position at its rearward end, whereby the releasable structure of the hinge means is enclosed and locked up when the cover is in closed, locked position relative to the truck bed.

The invention also comprises novel flexible fabric curtains at the sides and rearward end of the cover which extend from the inner portions of the cover downwardly and outwardly over the sides and the rear portion of the pickup truck bed and downwardly over the tailgate thereof when in open position, to provide a substantial enclosure in which campers may escape from the elements and may use as adequate shelter during rainstorms and for sleeping purposes. The curtains are readily removably connected to the inner side of the cover at their opposite sides and rearward end and may thus convert the truck bed cover of the invention from a utility cover for commercial uses to a truck bed cover for outdoor sporting use during hunting and fishing events or the like.

Accordingly it is an object of the present invention to provide a cover for pickup truck beds having novel removable hinge mechanism and stand mechanism for connecting the cover to a pickup truck bed and for supporting the cover in inclined open position relative to the rearward portion of the pickup truck bed, the invention additionally comprising novel means for releasing the hinge mechanism and the stand mechanism relative to a truck bed so that the cover may readily be removed or replaced relative to a pickup truck bed with a minimum amount of time and effort.

Another object of the invention is to provide novel releasable hinge mechanism for the forward end of a cover for a pickup truck bed.

Another object of the invention is to provide a novel inverted U-shaped stand mechanism for supporting a rearward end of a truck bed cover in open elevated position relative to the rearward end of a truck bed.

Another object of the invention is to provide a novel inverted U-shaped stand having legs and track following bearing means which traverse elongated tracks secured at inner opposite sides of a pickup truck bed.

Another object of the invention is to provide novel construction of a pickup truck bed cover wherein a thermo-plastic material is used to form a shell for the cover while a metal frame is utilized for connecting hinges and stand mechanisms to the shell for pivotally connecting the shell to a pickup truck bed so that it may be pivoted on a horizontal axis near the forward end of the pickup bed and so that it may lock in enclosed position relative thereto.

Another object of the invention is to provide a novel stand mechanism for holding covers in open position relative to pickup truck beds and wherein a U-shaped stand structure is provided with legs having bearings traversing generally horizontal tracks of a channel shaped cross section, said tracks being opposed to each other and secured at opposite inner sides of the truck bed, said tracks having upper flanges having notches therein adapted to release bearings carried by ends of the legs of said stand so that the stand mechanism may be readily removed from the tracks and the truck bed without releasing bolts or other structures which normally requires a substantial amount of time to manipulate.

Other objects and advantages of the invention may be apparent from the following specification, appended claims and accompanying drawings:

DESCRIPTION OF THE PREFERRED EMBODIMENTS

Figure 1:
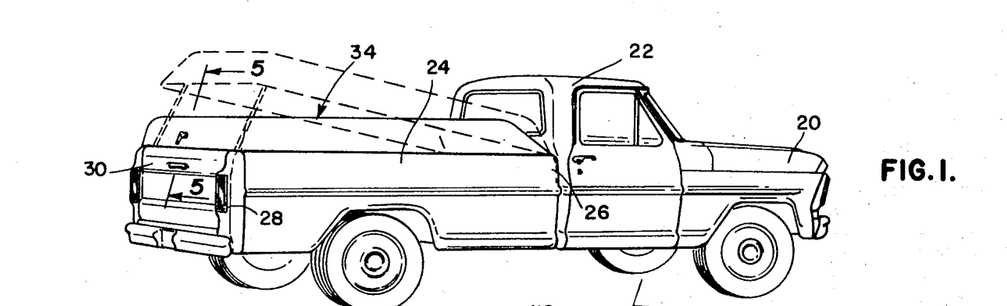
FIG. 1 is a prospective view of a pickup truck showing a truck bed cover of the invention covering the bed of the pickup truck and showing by broken lines a raised open position of the truck bed cover of the invention.
Figure 2:
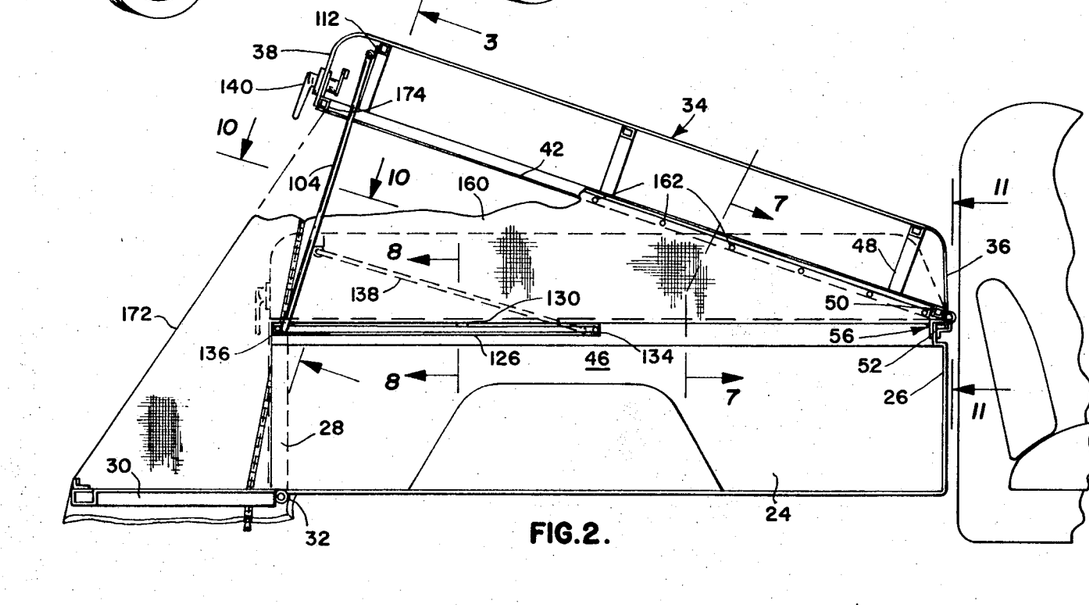
FIG. 2 is an enlarged fragmentary longitudinal sectional view of the pickup truck bed shown in FIG. 1 and illustrating the truck bed cover of the invention in elevated open position relative to the pickup truck bed, and showing by broken lines a closed position of the cover, and further illustrating a curtain means of the invention adapted to enclose the inner side of the cover and the pickup truck bed when the cover is in elevated position relative to the truck bed.

As shown in FIG. 1, a conventional pickup truck body, provided with a passenger cab 22 and a generally box-shaped pickup truck bed 24 which is opened at its upper side, a forward end 26 of the truck bed 24 is adjacent to cab 22 and a rearward end 28 of the pickup truck bed is provided with a conventional tailgate 30 which is pivotally mounted on a substantially horizontal axis indicated at 32 in FIG. 2 of the drawings. The tailgate 30 is adapted to be pivoted downwardly into substantially horizontal disposition as shown in FIG. 2 of the drawings.

Figure 3:
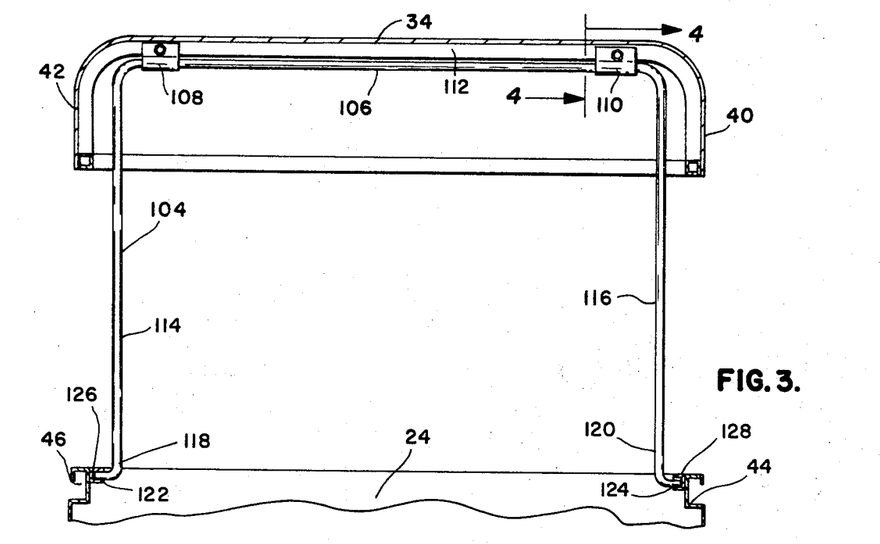
FIG. 3 is a slightly enlarged fragmentary sectional view taken from the line 3—3 of FIG. 2.

The cover of the invention is designated 34 and is a substantially box-shaped inverted structure shown best in FIGS. 2 and 3 of the drawings. This cover 34 is provided with a forward end 36 and a rearward end 38. As shown in FIG. 3 of the drawings, this cover is provided with opposite sides 40 and 42 which are adapted to overlie respective opposite sides 44 and 46 of the truck bed 24.

The cover 34 is provided with a frame 48 having a horizontal frame member 50 at said forward end 36.

Figure 12:
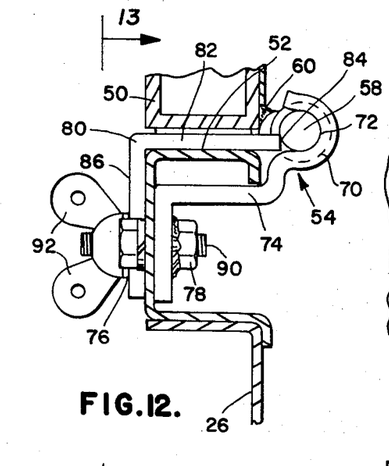
FIG. 12 is an enlarged fragmentary sectional view taken from the line 12—12 of FIG. 11, showing details of the hinge means of the invention.
Figure 13:
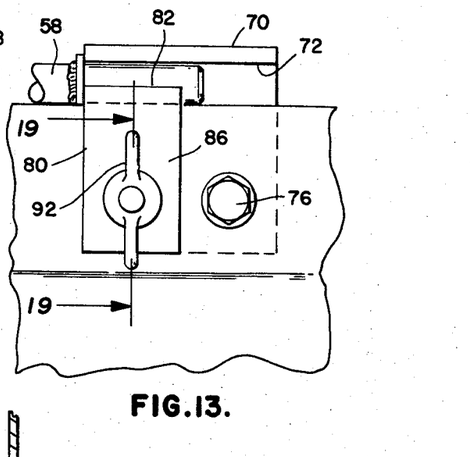
FIG. 13 is a fragmentary view taken from the line 13—13 of FIG. 12.

As shown in FIGS. 2 and 12 of the drawings, the frame member 50 overlies an upper edge 52 at the forward end 26 of the truck bed 24.

Figure 11:
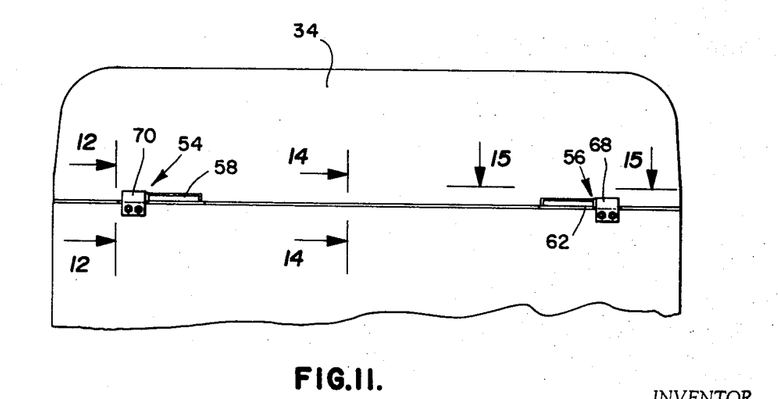
FIG. 11 is a fragmentary view taken from the line 11—11 of FIG. 2.

As shown in FIG. 11 of the drawings, a pair of hinge means 54 and 56 pivot the cover 34 on a substantially horizontal axis in connection with the forward end 26 of the pickup truck bed 24.

The hinge means 54 and 56 are opposite hand structures relative to the structure but otherwise identical and therefore the hinge means 54 will be described in detail as shown in FIGS. 12, 13, 14, and 19.

The hinge means 54 is provided with a hinge pin 58. This hinge pin 58 is welded at 60 to the frame member 50 of the cover 34 and this hinge pin 58 is similar to a hinge pin 62 of the hinge means 56. A shank portion of the pin 62 is welded at 64 and a laterally offset portion 66 of the hinge pin 62 forms a bearing which is retained in a hinge cradle 68 of the hinge means 56. The hinge means 54 is provided with a cradle 70 similar to the cradle 68. This hinge pin cradle 70 as shown in FIG. 12 of the drawings is provided with a semicircular bore portion 72 which engages a hinge bearing portion of the hinge pin 58. This semicircular bore portion 72 engages substantially 180° of the bearing portion of the hinge pin 58 and is open toward the rearward end 38 of the cover 34 so that the hinge pin 58 may be removed in a direction facing rearwardly as the cover 34 is drawn backward toward the tailgate 30.

The semicircular bore portion 72 of the cradle 70 is disposed substantially tangent to or slightly above the upper edge 52 of the flat portion 26 of the pickup truck bed so that the hinge pin 58 may slidably be moved backwardly over the upper edge of the pickup truck bed when the cover 34 is removed therefrom.

Figure 19:
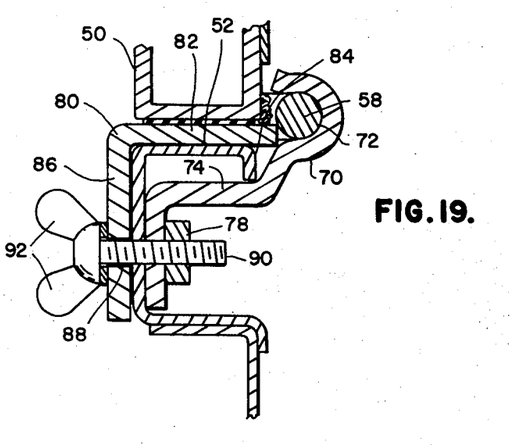
FIG. 19 is a fragmentary sectional view taken from the line 19—19 of FIG. 13.

A locking means 80 is provided with an L-shaped member having a horizontally disposed bar portion 82 which fits over the upper edge 52 of the truck bed and an end 84 of the bar portion 82 is engagable with and retains the bearing portion of the hinge pin 58 in the semicircular bearing portion of the cradle 70. The L-shaped member of the locking means 82 is provided with a vertical portion integral with the horizontal bar portion 82. This vertical portion is designated 86 and as shown in FIG. 19 this vertical portion 86 is provided with an opening 88 therethrough, and extending through this opening 88 is a wing bolt 90 which is provided with finger engaging wings 92 disposed at the inside of the front portion 26 of the truck bed 24.

The bolt 90 also extends through corresponding openings in the truck bed and the bracket 74, and this wing bolt 90 is screwed into the nut 78 which is welded to the bracket 74. Thus, when the wing bolt 90 is tightened, the locking means 80 at its vertical portion 86 is forced into contiguous relation with a rearward portion of the front end 26 of the truck bed 24 and the bar portion 82 at its end 84 is forced to hold the bearing of the hinge pin 58 in the bore portion 72 of the cradle 70. When the wing bolt 90 is removed from the nut 78 the locking member 80 may be removed so that its end 84 may be released from the position as shown in FIGS. 12 and 19, thereby allowing the bearing portion of the hinge pin 58 to be removed in a rearward direction backwardly over the upper edge 52 of the pickup truck bed 24 at its forward portion 26.

Figure 14:
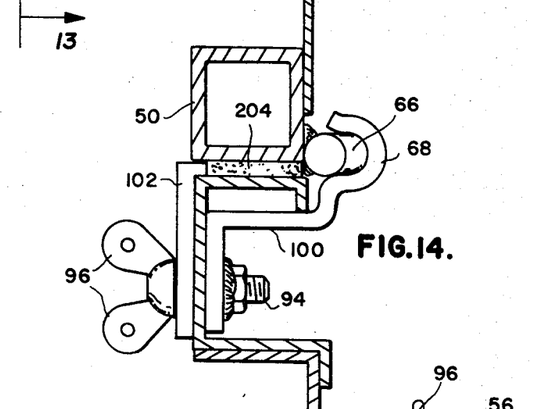
FIG. 14 is an enlarged fragmentary sectional view taken from the line 14—14 of FIG. 11.
Figure 15:
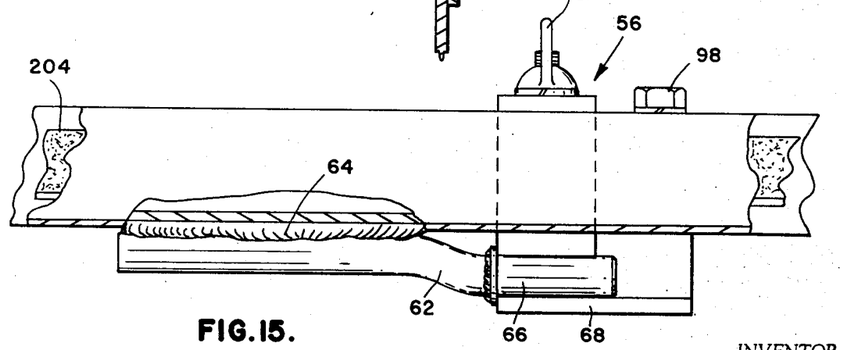
FIG. 15 is an enlarged fragmentary sectional view taken from the line 15—15 of FIG. 11.

As shown in FIG. 11, the hinge means 54 and 56 are identical except that they are opposite hand and the hinge means 56 is provided with a wing bolt 94 similar to the wing bolt 90 hereinbefore described in connection with FIG. 19 of the drawings. The wing bolt 94 is provided with finger engaging wings 96 as shown best in FIGS. 14 and 15 of the drawings. The hinge means 56 is also provided with a bolt 98 similar to the bolt 76 for holding the respective cradle 68 in position by means of a bracket 100 which is integral with the cradle 68 as shown in FIG. 14.

It will be seen that the removal of the wing bolts 90 and 94 will permit the respective locking means 80 and 102 of the hinge means 54 and 56 to be released and to allow the movement of the hinge pins 58 and 62 rearwardly out of their respective hinge cradles 70 and 68 as hereinbefore described. When the locking means 80 and 102 are in the positions as shown in FIGS. 12 and 14, the respective hinge pin bearings of the hinge pins 58 and 62 are held in the respective cradles 70 and 68 so that the hinge pins may rotate relatively thereto and inasmuch as these hinge pins are welded to the frame member 50, they will pivot in the respective cradles 70 and 68 as the cover 34 of the invention is pivoted upward from a broken line position as shown in FIG. 2 to the solid line position as shown therein and then backwardly down into the broken line position.

A stand means 104, shown in FIGS. 1 and 2 of the drawings, comprises a generally U-shaped member which is in inverted U-shaped position when the cover 34 is in the solid line raised position as shown in FIGS. 2 and 3 of the drawings. This stand means 104 comprises generally inverted U-shaped structure as shown in FIGS. 2 and 3 of the drawings and may be constructed either of a single piece of steel rod or may be constructed of a plurality of members such that the stand is provided with intermediate bearing bar portion 106 which is pivotally mounted on a horizontal axis and a pair of bearings 108 and 110 secured to the upper inner portion of the cover 34 in connection with a frame cross member 112 which is near the rear end 38 of the cover 34. The stand means 104 is provided with a pair of legs 114 and 116 which extend upwardly and downwardly in the position as shown in FIGS. 2 and 3 of the drawings, for holding the cover 34 in inclined position in a rearward direction toward the tailgate end 28 of the pickup truck bed 24. The bearing means 110 is similar to the bearing means 108 and comprises a loop-shaped clamp 118 connected by a bolt 120 to the frame cross member 112, shown in FIGS. 2 and 3 of the drawings.

The legs 114 and 116 of the stand means 104 are rigidly connected to the bar 106 so that force applied to either of the legs will create torsional stress in the bar 106 and tend to move the remaining leg in the same direction.

The legs 114 and 116 at their extending ends 118 and 120 are provided with bearing means 122 and 124 which serve as track following bearing means disposed in relation to tracks 126 and 128, respectively. These tracks 126 and 128 are disposed at inner portions of the opposite sides 46 and 44 respectively of the truck bed 24.

Figures 7, 8, 9, 10:
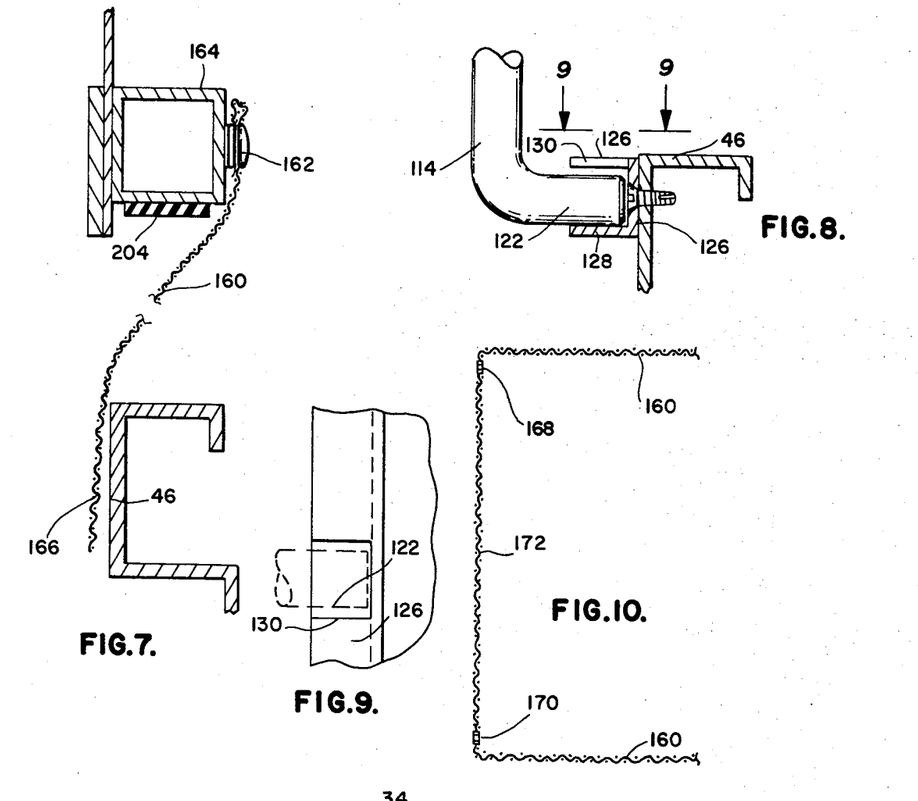
FIG. 7 is an enlarged fragmentary sectional view taken from the line 7—7 of FIG. 2.
FIG. 8 is an enlarged fragmentary sectional view taken from the line 8—8 of FIG. 2.
FIG. 9 is a fragmentary plan view taken from the line 9—9 of FIG. 8.
FIG. 10 is a fragmentary plan sectional view taken from the line 10—10 of FIG. 2.

The tracks 126, as for example, are channel shaped in cross section and oppose each other. Each track is provided with structure substantially as shown in FIGS. 8 and 9 of the drawings. These tracks 122 and 124 are provided with upper and lower flanges which are similar. As shown in FIG. 8, the track 122 is provided with an upper flange 126 and a lower flange 128 between which the bearing means 122 slides. This bearing means 122 of the leg 114 is merely an end portion of the leg 114 formed at right angles thereto, however a roller or other suitable track following bearing means may be utilized as desired, and the configuration of the track 122 may be appropriately shaped.

The lower flange 128 of the channel-shaped track 122 is continuous, while the upper flange 126 is provided with an open notched portion 130 as shown best in FIGS. 8 and 9 of the drawings. This notch 130 is adapted to allow the track following bearing portion 122 to be removed vertically therethrough so as to provide for release of the stand 104 from the respective tracks 126 and 128.

The track 128 is provided with a notch similar to the notch 130 of the track 126 and therefore both bearing portions 122 and 124 may be vertically moved from the respective tracks 126 and 128, and the notches 130 are located as shown in FIG. 2 such that these notches 130 are in an intermediate position between forward and rearward ends 134 and 136 of the tracks, as shown in FIG. 2 of the drawings. Thus, the stand 104 must be pivoted forward at its bearing portions 122 and 124 to a location of the notches 130 as shown in FIG. 2 of the drawings, then the bearing portions may be raised vertically through the notches 130 so that both legs 114 and 116 may be released from the respective tracks 126 and 128. Concurrently, the locking means 80 and 102 may be released by the respective wing bolts 90 and 94 to allow the entire cover and stand mechanism readily to be removed in a rearward direction from the pickup truck bed 24. The reverse procedure may be used to reinstall the cover 34 by moving the cover 34 longitudinally on top of the truck bed 24 toward the forward end 26 thereof, until the hinge pins 56 and 58 are engaged in their respective cradles 68 and 70, whereupon the locking members 80 and 102 may again be replaced in their positions, as shown in FIGS. 12 and 14, and the wing bolts 90 and 94 may be re-installed for securing the hinge pins 62 and 58 with respect to the cradles 68 and 70 of the hinge means 56 and 54, respectively. The bearing means 122 and 124 of the legs 114 and 116 may then be vertically placed downwardly through the slots 130 and pulled backwardly to the position shown in FIG. 2 of the drawings, for supporting the cover 34 in elevated open position or the bearing means 122 and 124 on the legs 114 and 116 may be forced forwardly in the respective tracks 126 and 128 to a position near the forward ends 134 thereof, as shown in FIG. 2 of the drawings, so that the U-shaped stand means 104 is in a more nearly horizontal position as shown by broken lines 138 in FIG. 2 of the drawings.

When the cover of if the invention is supported in elevated position by the stand 104, as shown in FIG. 2 of the drawings, a person may reach into the interior of the truck bed 26 near the forward end thereof, and manipulate the wings 92 and 96 of the respective wing bolts 90 and 94, for releasing or connecting the respective locking members 80 and 102. Thus, these locking members may initially be released before the stand 104 is moved from the position as shown in FIG. 2, whereupon it may be moved forward to release the bearing portions 122 and 124 from the tracks 126 and 128, as hereinbefore described. The reverse procedure for replacing the cover 34 on the truck bed 24, may be followed.

It will be appreciated by those skilled in the art that the only screw threaded connections are provided by the wing bolts 90 and 94 for holding the cover 34 on the truck bed, with the exception of a hold-down locking means 140 at the rearward portion 38 of the cover 34, as will be hereinafter described. Accordingly, it will be appreciated by those skilled in the art that the release of the two wing bolts 90 and 94 may be accomplished very quickly and the replacement of these bolts may be accomplished very quickly, so that a person may remove the cover 34 of the invention from the conventional truck bed 24, in a matter of a minute and may use approximately the same amount of time to replace the cover 34. Accordingly, those wishing to haul large or bulky articles having a high elevation may remove the cover 34 very conveniently and very quickly and may then, after hauling such large, bulky articles, replace the cover 34 with a minimum amount of time and effort.

Figures 4, 5, 6:
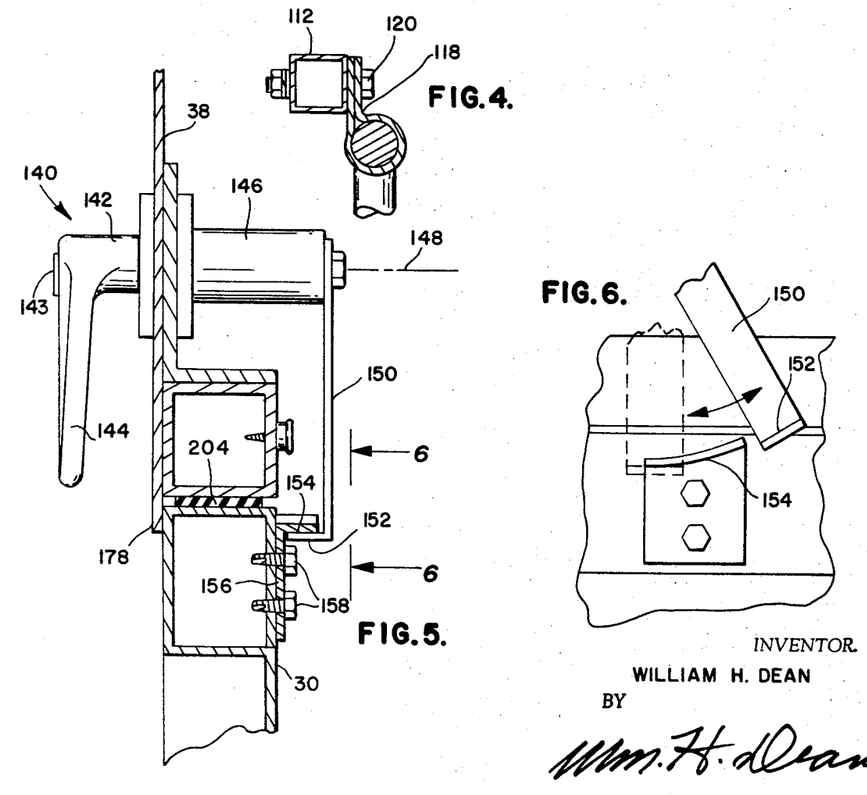
FIG. 4 is an enlarged fragmentary sectional view taken from the line 4—4 of FIG. 3.
FIG. 5 is an enlarged fragmentary sectional view taken from the line 5—5 of FIG. 1, showing details of the locking mechanism for holding the rear end of the cover of the invention downwardly relative to the tailgate of a pickup truck bed.
FIG. 6 is a fragmentary elevational view taken from the line 6—6 of FIG. 5.

The locking means 140 at the rear portion 38 of the cover 34 is disclosed in detail in FIG. 5 of the drawings. This locking means comprises a conventional automotive type locking handle 142 having a tumbler lock 143 in one end thereof. A cantilever handle 144 is adapted to rotate the shank 146 of the handle 142 about a horizontal axis 148 when the cover is in its closed position, as shown by solid lines in FIG. 1 of the drawings, and by broken lines in FIG. 2 of the drawings.

Coupled to the shank 146 is a cam lock arm 150, having an angular end portion 152 engaging a cam ledge 154 of a clip 156 secured to the tailgate 30 by means of a pair of screws 158. This structure is shown in FIG. 6 of the drawings and in position wherein the arm 150 is in released position from the cam ledge 154 so that the portion 152 is disengaged therefrom to allow the cover 34 of the invention to be pivoted upwardly about the axes of the hinge pins 58 and 62 to the position shown by solid lines in FIG. 2 of the drawings, whereby the stand 104 may be grasped by one of the legs 114 and 116 and both legs may then be pulled backward and slidably moved at their bearing portions 122 and 124 in the respective tracks 126 and 128. This is accomplished by torsional transmittal of force by the bar 106 which interconnects the legs 114 and 116.

As shown in FIGS. 2, 7 and 10 of the drawings, flexible curtains 160 are connected by removable snaps 162 to longitudinal frame members 164 of the cover at opposite sides thereof.

The flexible curtains 160 are preferably made of canvas or other suitable material and are provided with downwardly extending portions 166 adapted to extend over and downwardly relative to outer sides 44 and 46 of the truck bed 24. These flexible curtains 160 are provided with zippers 168 and 170, shown in FIG. 10 of the drawings, and these zippers 168 and 170 are connected to opposite edges of a rear curtain 172 which is adapted to extend downwardly over the edge of the tailgate 30, as shown on FIG. 2 of the drawings. The curtains 160 and 172, together with the zippers 168 and 170, provide a removable enclosure between the cover 34 and the truck bed 24 when the cover 34 is in the open solid line position relative to the truck bed 24, as shown on FIG. 2 of the drawings.

An upper edge portion of the curtain 172 is connected to a cross frame member 174 at the rear portion 38 of the cover 34, and the cross member 174 is provided with snaps similar to the snaps 162 for holding the upper edge of the curtain 172 in connection with the rearward portion 38 of the cover 34.

It will appreciated by those skilled in the art that the curtains 160 and 172 may readily be attached or removed relative to the inner opposite sides and rearward portion of the cover 34, so that a convenience is provided for sheltering the inside of the truck bed when the cover 34 is in inclined elevated open position, as shown by solid lines in FIG. 2 of the drawings. It will be appreciated that in this position the cover affords sufficient room in the truck bed so that a person may be provided with a living enclosure wherein he may sleep or camp during foul weather conditions, such as may be encountered when utilizing the invention on a pickup truck during a hunting or fishing trip.

It will be appreciated by those skilled in the art that the cover of the invention may be useful to tradesmen such as carpenters or other persons wishing to carry and enclose, as well as lock up, valuable tools in the bed of a conventional pickup truck. Further it will be appreciated that the readily removable relationship of the cover 34 to the pickup truck bed 24 allows the cover to be a shallow, compact and very economical structure and to be readily usable in connection with a pickup truck bed at all times except when bulky loads are to be carried therein, and for such purposes the cover is readily, quickly and easily removable and replaced as desired.

A novel stand means 104 being U-shaped, as shown in FIGS. 2 and 3 of the drawings, is so disposed that the legs thereof are closely adjacent opposite sides of the pickup truck bed, and the bar portion 106 is near the rear end 38 of the cover 34 so as to straddle a load carried inside the truck bed when the cover 34 is in the closed broken line position, as shown in FIG. 2 of the drawings.

When the cover 34 is in locked position and held in such position by the locking handle mechanism 140, a rear downwardly extending skirt edge portion 178 of the rear portion 38 of the cover 34 is disposed rearwardly of the tailgate 30, preventing it from being pivoted backwardly and downwardly into open position, as shown in FIG. 2 of the drawings.

Figure 16:
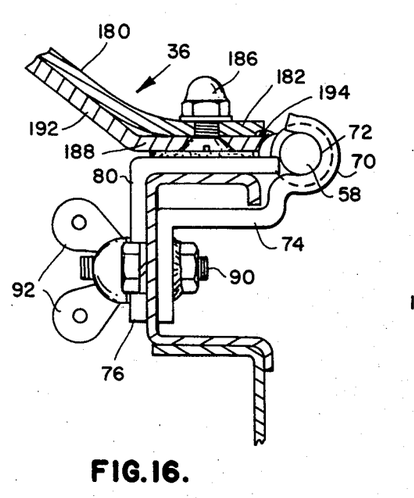
FIG. 16 is a view similar to FIG. 12 but showing a modification of the invention.
Figure 17:
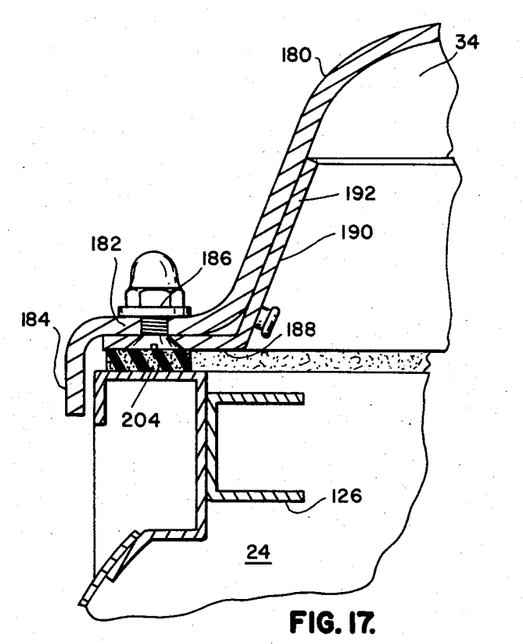
FIG. 17 is a vertical sectional view taken through a side edge of the cover of the invention and a respective side portion of a pickup truck bed, showing a modification of the invention compatible with the structure shown in FIG. 16.
Figure 18:
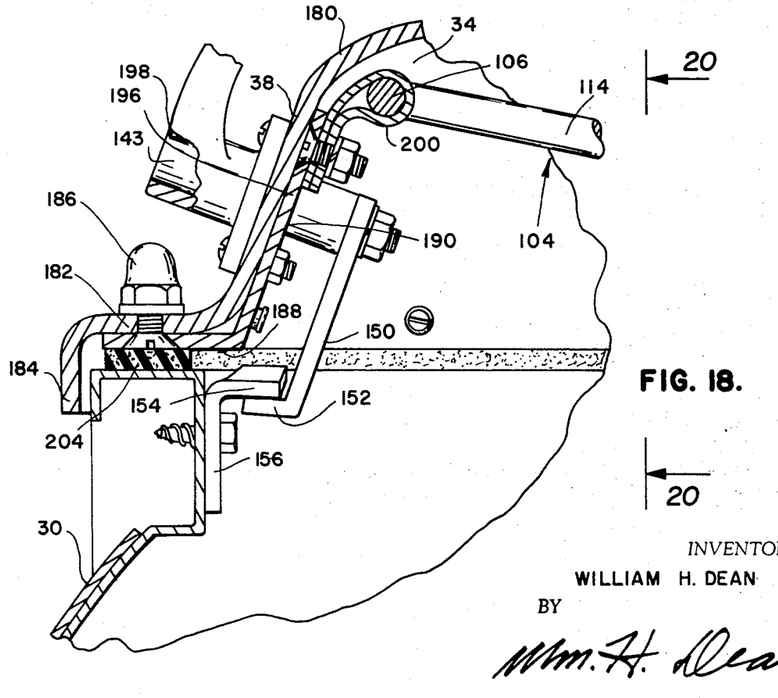
FIG. 18 is a view similar to FIG. 5 but showing a modification of the structure compatible with that shown in FIGS. 16 and 17.

In the modification of the invention as shown in FIGS. 16, 17 and 18 of the drawings, a cover shell 180 is formed of thermoplastic material, metal, or other suitable material. This shell 180 is preferably of contoured shape and requires tools and dies to form it in a single unitary structure.

The shell 180 is provided with a horizontal flange portion 182 adapted to fit over the upper edge of a pickup truck bed and integral with the horizontal flange portion 182 is a downwardly extending skirt 184 which fits downward about the outer side of the pickup truck bed 24.

Secured by bolts 186 to the horizontal flange portion 182 is a horizontal flange 188 of a metal frame 190. This metal frame 190 is provided with an upwardly extending flange 192 integral with the horizontal flange 188.

As shown in FIG. 16, a forward position 36 of the modified cover 34 is provided with structure similar to that shown in FIG. 17 wherein the bolts 186 connect the horizontal flanges 182 of the cover shell 180 with horizontal flanges 188 of the frame 190 which is also provided with an upwardly extending flange 192.

Coupled with an edge portion 194 of the flange 188 are the hinge pins 58 and 62, as hereinbefore described in FIGS. 12, 13, 14, and 15.

The modified structure adjacent the tailgate 30 includes the bolts 186 connecting the flange 182 of the cover shell 180 and the flange 188 of the frame 190.

At the rearward end 38 of the cover 34 the frame 190 is provided with a substantially higher flange 196, similar to the flange 192, and connected to this flange 196 is a tumbler lock handle mechanism 198, similar to that shown in FIG. 5 of the drawings.

Also connected to the flange 196 are stand mount bearings 200 which pivotally mount the torsion bar portion 106 of the stand 104.

The skirt portion 184 of the cover shell 180, shown in FIG. 18, extends downwardly into interference with the rear side of the tailgate 30 so that it cannot be pivoted backwardly and downwardly into open position when the portion 152 of the arm 150 is engaged with the cam ledge portion 154, as shown in FIGS. 5 and 18 of the drawings. The locking mechanism shown in FIG. 18 of the drawings is substantially identical to that shown in FIG. 5 of the drawings, and therefore when this mechanism is locked holding the rearward end 38 of the cover 34 downwardly over the tailgate 30, the shirt 184 of the thermo plastic cover member 180 thus interferes with the opening of the tailgate 30 and thereby prevents anyone from gaining access to the interior of the truck bed 24 when the cover 34 is locked down as shown in FIGS. 5 and 18 of the drawings.

In FIGS. 5, 7, 14, 17 and 18 of the drawings, a compressible foam rubber gasket 204 is shown between the cover 34 and the upper edge of the truck bed 24. This foam gasket 204 is adhesively secured to the structure of the cover 34 and tends compressively to bear on the upper edge of the truck bed around its outer portions, to seal the interior of the truck bed 24 against the entrance of dust, water or other foreign matter.

The modified structure shown in FIGS. 16, 17 and 18 of the drawings, including the contoured shell 180, may be very economically produced as compared to a conventional riveted sheet metal structure. This shell 180 may be vacuum formed; it may be formed by a large press, and in the case of vacuum forming, thermo plastic material may be used, while metal may be used if a large press and suitable dies are provided for forming the shell 180 in proper contoured shape. Thus, mass production tooling for forming the contoured shell 180 may afford substantially economical production of the truck bed cover of the invention.

The frame 190 may serve to provide a substantial structure for the perimeter of the shell 180 so that it may be made of relatively lightweight material or material of somewhat lower tensile strength than steel.

Figure 20:
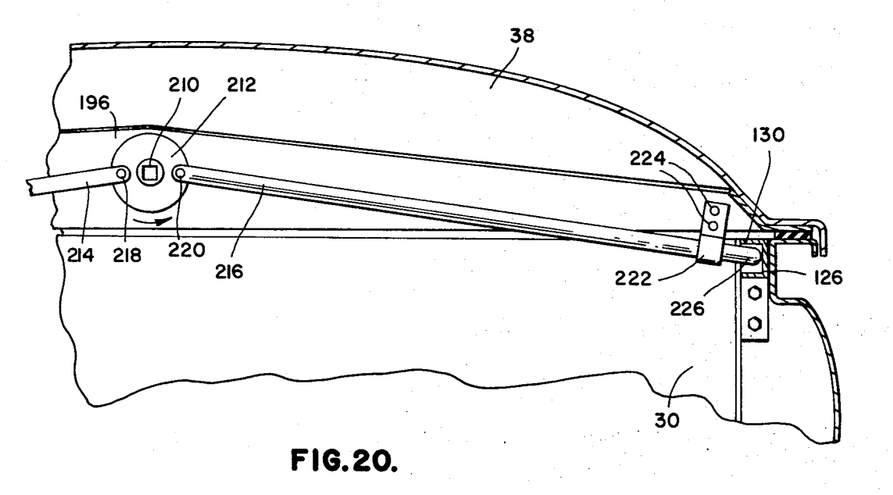
FIG. 20 is a fragmentary sectional view taken from the line 20—20 of FIG. 18 but showing a further modification of the cover hold down locking mechanism of the invention.

As shown in FIG. 20 of the drawings, a tumbler lock shaft 210 carries a disc 212 and the shaft 210 is rotatably mounted in connection with a flange 196 as shown in FIG. 18 of the drawings. This flange 196 is an upstanding flange adjacent the rearward portion 38 of the cover of the invention.

Pivotally mounted in connection with the disc 212 are a pair of lock arms 214 and 216. Pins 218 and 220 pivotally connect the lock arms 214 and 216 with the disc 212, to form cranks.

The lock arms 214 and 216 are similar and therefore the lock arm 216 will be described in detail. This lock arm 216 is slidably mounted in a loop shaped bearing 222 which is mounted by rivets 224 to the flange 196. An end portion 226 is retractably movable into a position below the upper flange 130 of a respective track 126 near the truck tailgate 30.

When a tumbler lock handle such as the handle 144, as shown in FIG. 5, or a similar handle shown in FIG. 18, is rotated, the disc 210 is rotated causing retraction of an end portion of the locking bar 216 from a position beneath the flange 130, as shown in FIG. 20, or rotation in the opposite direction of the disc 212 causes extension of the end 226 to a position below the upper flange 130 of the channel 126. Said flange serves as a strike structure.

Similar engagement of a similar end of the locking bar 214 may occur with respect to a channel track on the opposite inner side of the truck bed.

Figures 21, 22, 23:
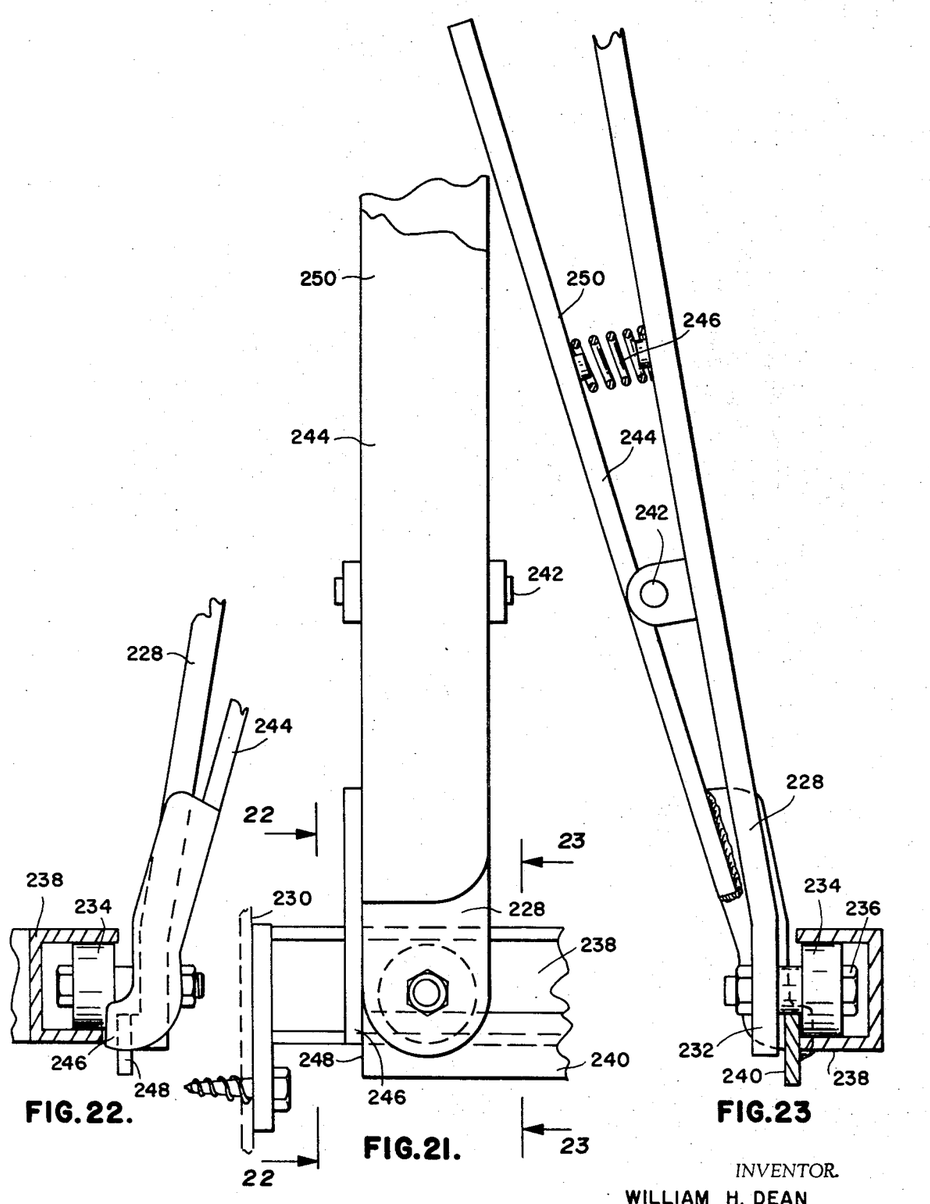
FIG. 21 is a fragmentary enlarged elevational view of a rearward end of one of the track mechanisms of the invention, showing a latching mechanism in connection with one of the stand legs of the invention.
FIG. 22 is a fragmentary sectional view taken from the line 22—22 of FIG. 21.
FIG. 23 is a sectional view taken from the line 23—23 of FIG. 21.

As shown in FIG. 21 of the drawings, a modified leg of the stand mechanism of the invention is disclosed. This leg is similar in position to the leg 114 shown in FIG. 3 of the drawings. The leg in FIG. 21 is designated 228 and is viewed from the inner side of the cover of the invention in adjacent relation to a rearward portion 230 of the respective truck bed near the tailgate thereof. The leg 228 at its lower end 232 is fitted with a roller bearing 234 which is secured thereto by means of a bolt 236. This rotary bearing traverses a track 238 similar to the track 126 hereinbefore described. Track 238 is modified and provided with a flange member 240 adapted to prevent axial removal of the bearing 234 from the open side of the channel-shaped track 238.

Pivotally mounted on the leg 228 by means of a pin 242 is a latch lever 244, and a spring 246 between the leg 228 and the lever 244 tends to pivot the lever 244 in the direction of an arrow "A," as shown in FIG. 23 of the drawings. The latch lever 244 is provided with a latch portion 246 adapted to engage an end 248 of the flange member 240 for holding the leg 228 in a substantially upright position and to prevent accidental pivotal movement of the legs forwardly. Movement of the leg 228 forwardly may be accomplished by squeezing the lever 244 at its portion 250 toward the leg 228 for pivoting the latch portion 246 out of interference with the end 248 of the flange 240. Thus, the lower end of the leg 228 may be released so that the roller 234 may traverse forwardly in the track 238 toward the forward end of the pickup truck bed with which the track 238 may be connected. This modified mechanism, as shown in FIGS. 21, 22 and 23 of the drawings, provides for secure holding of the leg 228 in upstanding position for holding the cover in inclined open position as shown by solid lines in FIG. 2 of the drawings, and this latch mechanism as shown in FIGS. 21, 22 and 23 may be utilized for holding the stand legs of the invention in substantially upright position during traveling when the cover of the invention is in open position.

Figure 24:
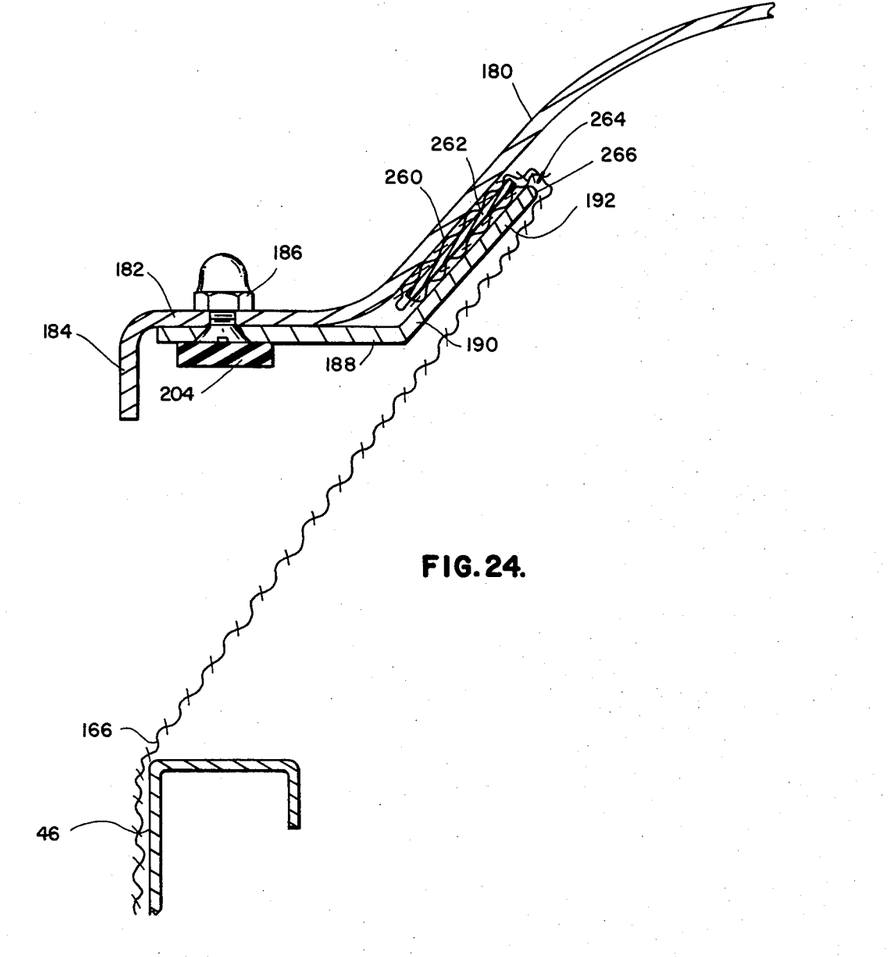
FIG. 24 is a view similar to FIGS. 7 and 17 but showing an additional modification of the invention.

In the modification shown in FIG. 24, a curtain holding structure is disclosed. The cover shell 180 forms an upstanding wall structure, and spaced therefrom is an upstanding wall structure 192. A curtain 166 is provided with a loop edge 260 held by a seam 264. A flexible semi-rigid member 262 is disposed in said loop edge 260. The loop edge 260 containing the member 262 is disposed between the upstanding wall structure of the cover 180 and the wall structure 192. The upstanding wall structure 192 is provided with an upper edge 266 over which the curtain is engaged and from which it extends downwardly to an outer side of a pickup truck bed 46, the cross section of said member 262, in an upward and downward direction, being greater in dimension than the distance between said upstanding wall structures 180 and 192.

It will be understood that the foregoing specification comprises a disclosure of structures which are examples only of the invention and that various modifications may be made in relation to the overall combination and the details of the invention, without departing from the general spirit of the invention.

I claim:

1. In a truck bed cover, the combination of; a cover adapted to enclose the upper side of a generally box-shaped pickup truck bed; said cover having a forward end adapted to be disposed adjacent to a pickup truck cab; said cover having a rearward end adapted to be disposed adjacent a pickup truck tailgate; said cover having opposite sides extending between said forward and rearward ends; hinge means at said forward end of said cover and adapted pivotally to couple said forward end of said cover to said pickup truck bed; said hinge means having a horizontal axis whereby said rearward end of said cover may be elevated to a raised position relative to said tailgate; stand means adapted to support said cover in said raised position relative to said truck bed; said stand means having structure of a configuration which is generally U-shaped; said U-shaped structure being disposed in an inverted position when said rearward portion of said cover is supported in raised position by said stand means; said U-shaped structure of said stand means comprising an intermediate horizontally disposed torque transmitting bar portion; first bearing means carried by said cover, said bar portion being pivotally carried by said first bearing means; said first bearing means having a generally horizontal axis; said U-shaped structure of said stand also having a pair of legs, said legs having first ends fixed to said bar portion; said legs extending downwardly from said bar portion when said stand means supports said cover in raised position; said legs being disposed adjacent respective opposite sides of said cover, and adapted to straddle an inner load carrying area of said truck bed; said legs having second ends; track following bearing means carried at said second ends of said legs; a pair of elongated tracks having forward and rearward ends; said tracks adapted to be secured to opposite inner sides of a pickup truck bed in adjacent relation to said opposite sides of said cover, said tracks being elongated in a generally forward and rearward direction relative to said pickup truck bed; said track following bearing means at said second ends of said legs being adapted to engage and follow respective ones of said tracks, whereby said legs are disposed generally in an up and down disposition when said cover is in raised position and said legs are disposed in a more nearly horizontal position when said cover is lowered to enclose the upper open side of said pickup truck bed; said tracks each being provided with channel shaped in cross-section structure and so disposed that said channel shaped structure is open in a direction facing inwardly relative to respective opposite sides of said cover; a respective one of said track following bearing means disposed and movable in each channel shaped structure; said channel shaped structure being provided with lower and upper flanges, the upper one of said flanges having an opening adapted to permit upward vertical movement of a respective one of said track following bearing means therethrough; said opening in each upper flange of each of said elongated tracks being located at a position intermediate opposite ends of each respective track; said hinge means being provided with releasable hinge pin means coupled to said cover; said hinge pin means adapted to permit removal of said cover relative to said hinge means and relative to said truck bed; releasable means releasably holding said hinge pin means relative to said hinge means for fixing said cover in pivoted relation to said truck bed; said hinge means being provided with bearing structure in which said hinge pin means is releasably held by said releasable means; said bearing structure comprising substantially U-shaped hinge pin cradle means adapted to provide pivotal support around approximately 180° of the periphery of said hinge pin means; said cradle means being provided with an open side directed toward said rearward end of said cover, said hinge pin means carried by said cover.

2. The invention as defined in 1, wherein said cradle means is secured to a forward end structure of said pickup truck bed, said hinge pin means secured to a forward portion of said truck bed at an inner portion thereof.

3. The invention as defined in 1, wherein said cradle means is provided with an open side directed toward said rearward end of said cover, said hinge pin means carried by said cover, said open side of said cradle means being adapted to be disposed slightly above an upper forward end of said truck bed, locking means removably connected to a forward end of said truck bed, said locking means being L-shaped and having a vertical portion adapted to be disposed in adjacent relation to a vertical inner portion of said truck bed at the forward end thereof; said bearing bar being integral with said vertical portion of said locking means; said bearing bar adapted to extend forwardly over an upper forward edge of said truck bed and to oppose rearward removal of said hinge pin means relative to said cradle means.

4. The invention as defined in claim 1, wherein said first bearing means is fixed to said cover near said rearward end thereof.

5. The invention as defined in claim 1, wherein a pair of flexible side curtains are removably secured to inner portions of said opposite sides of said cover and are adapted to extend downwardly over respective outer sides of said truck bed; and a rear curtain removably secured to an inner portion of said rearward end of said cover and adapted to extend downwardly and outwardly relative to said tailgate of said pickup truck bed.

6. The invention as defined in claim 5, wherein said side curtains and said rear curtains are provided with adjacent substantially vertical edges; and means removably connecting said vertical edges together to enclose a space between said cover and said truck bed when said cover is in raised position.

7. The invention as defined in claim 5, wherein said rear curtain adapted to extend outwardly over said tailgate when it is pivoted downwardly into a horizontally rearward position relative to said truck bed.

8. The invention as defined in claim 1, wherein said cover is provided with a rear edge portion adapted to be disposed behind said tailgate when said cover is in downward position, whereby said rear edge tends to prevent said tailgate from being pivoted to an open position.

9. The invention as defined in claim 1, wherein said cover comprises an inverted generally box-shaped shell, said shell having an integral horizontal flange structure at said forward end, and at said sides, and said rearward end; said flange structure adapted to overlie the upper edge portions of said pickup truck bed; a downwardly extending skirt structure integral with said horizontal flange structure at said sides, and said rearward end; said downwardly extending skirt structure adapted to extend beyond respective opposite sides and the rearward end of said pickup truck bed; a rectangular frame having horizontal flange portions fixed to lower sides of respective ones of said horizontal flange structures; said frame having upwardly extending flange portions extending upwardly at the inner side of said cover at said forward and rearward ends of said cover; said hinge means fixed to said horizontal flange portions of said frame at said forward end; and locking means secured to one of said upwardly extending flange portions of said frame at said rearward end.

10. The invention as defined in claim 9, wherein said shell is made of thermo plastic material, and said frame is made of metal.

11. The invention as defined in claim 1, wherein a latch lever is pivotally mounted on one leg of said stand and a spring tends to pivot said latch lever relative to said leg, said latch lever having a latch portion engageable with a respective one of said pair of tracks for holding said leg in a substantially up and down position and tending to prevent inadvertent movement of said leg relative to the respective track in a forward direction toward the forward end of said cover.

12. The invention as defined in claim 1, wherein said tracks are channel shaped and provided with flange means for retaining said track following bearing means therein, to prevent lateral movement of said bearing means out of said tracks in a direction toward the inner side of said truck bed.

13. The invention as defined in claim 1, wherein said tracks are provided with strike structures; rotary locking means carried by said cover at said rear end thereof, said locking means being provided with a rotatable shaft having cranks and a pair of locking bars pivotally operable in connection with said cranks and having outer ends adapted to engage respective strike structures on said tracks; and guide means for said locking bars secured to said cover at said rearward portion and near said respective tracks for guiding said locking bars into engagement with said tracks for holding the rearward end of said cover downwardly with respect to a truck bed on which it is mounted.

14. The invention as defined in claim 1, wherein said cover is provided with a pair of spaced apart upstanding wall structures; a flexible curtain is provided with a loop edge disposed between said wall structures; a relatively rigid member in said loop edge, one of said wall structures having an upper edge over which said curtain extends and from which said curtain extends downwardly to take a position at an outer side of a pickup truck bed, said relatively rigid member and said loop edge being elongated in an upwardly and downwardly disposed cross section and of a combined dimension greater than the distance between said spaced apart upstanding wall structures.

* * * * *